United States Patent
Jang et al.

(10) Patent No.: US 9,160,831 B2
(45) Date of Patent: Oct. 13, 2015

(54) APPARATUS FOR CONTROLLING OPERATION IN WIRELESS TERMINAL WITH REMOVABLE CASE

(75) Inventors: Hwan-Gee Jang, Gumi-si (KR);
Dong-Wook Kwon, Daegu (KR);
Byung-Yeol Ko, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2185 days.

(21) Appl. No.: 11/850,816

(22) Filed: Sep. 6, 2007

(65) Prior Publication Data
US 2008/0227505 A1  Sep. 18, 2008

(30) Foreign Application Priority Data
Mar. 13, 2007  (KR) .................. 10-2007-0024700

(51) Int. Cl.
| H04M 1/00 | (2006.01) |
| H04B 1/38 | (2015.01) |
| H04M 1/667 | (2006.01) |
| H04M 1/02 | (2006.01) |
| H04M 1/725 | (2006.01) |

(52) U.S. Cl.
CPC ............ *H04M 1/667* (2013.01); *H04M 1/0245* (2013.01); *H04M 1/0283* (2013.01); *H04M 1/72544* (2013.01); *H04M 1/72561* (2013.01); *H04M 1/72588* (2013.01); *H04M 2250/16* (2013.01); *H04M 2250/18* (2013.01); *H04M 2250/22* (2013.01)

(58) Field of Classification Search
CPC . H04M 1/667; H04M 1/0245; H04M 1/0283; H04M 1/72544; H04M 2250/16; H04M 2250/18
USPC ............... 455/425, 550.1, 566, 575.3, 575.5, 455/575.8, 575.4, 575.1; 345/1.1, 1.2, 1.3, 345/30, 31, 33, 40, 42, 51
See application file for complete search history.

(56) References Cited

U.S. PATENT DOCUMENTS

| 6,081,595 | A  * | 6/2000 | Picaud ......................... 379/446 |
| 6,203,363 | B1 * | 3/2001 | Yanaura ....................... 439/500 |
| 6,466,292 | B1 * | 10/2002 | Kim ............................. 349/143 |
| 7,050,293 | B2 * | 5/2006 | Arbisi et al. ................ 361/679.3 |
| 7,234,854 | B2 * | 6/2007 | Masamoto ................... 362/612 |
| 7,414,855 | B1 * | 8/2008 | Arnold ......................... 361/752 |
| 8,384,615 | B2 * | 2/2013 | Tan et al. ....................... 345/1.1 |

(Continued)

FOREIGN PATENT DOCUMENTS

| KR | 2005050823 | A | * | 2/2000 |
| KR | 2005050823 | A | * | 6/2005 |
| KR | 10-0688466 | B1 |   | 3/2007 |

Primary Examiner — Magdi Elhag
(74) Attorney, Agent, or Firm — Jefferson IP Law, LLP (57) ABSTRACT

An apparatus for controlling the operation of a portable terminal having a removable case is provided. The apparatus includes a plurality of display units, each of the plurality of display units disposed in at least one of a front surface and a rear surface of the portable terminal, a detecting unit for detecting that at least one of the front or rear surfaces of the portable terminal is proximate to a corresponding cover of the removable case and a controller for activating a display unit disposed in one of the front and rear surfaces of the portable terminal when proximity of a corresponding cover of the removable case to said one of the front and rear surface is not detected. Accordingly, a user's ability to shift between screens is more easily performed and may be performed without a separate key input.

19 Claims, 9 Drawing Sheets

(56) References Cited

U.S. PATENT DOCUMENTS

| | | |
|---|---|---|
| 2002/0022503 A1* | 2/2002 | Lee .................. 455/566 |
| 2005/0197165 A1* | 9/2005 | Chen .................. 455/566 |
| 2005/0264719 A1* | 12/2005 | Sung et al. .................. 349/96 |
| 2006/0018088 A1* | 1/2006 | Gitzinger et al. .............. 361/681 |
| 2006/0066227 A1* | 3/2006 | Virnich et al. ................ 313/505 |
| 2006/0139297 A1* | 6/2006 | Maatta et al. .................. 345/102 |
| 2006/0248363 A1* | 11/2006 | Chen et al. .................... 713/300 |
| 2006/0281503 A1* | 12/2006 | Vigil .......................... 455/575.3 |
| 2007/0013608 A1* | 1/2007 | Goo et al. ..................... 345/1.1 |
| 2007/0227939 A1* | 10/2007 | Chen ............................ 206/701 |
| 2012/0081319 A1* | 4/2012 | Gimpl et al. .................. 345/173 |
| 2015/0062097 A1* | 3/2015 | Chung et al. .................. 345/184 |

* cited by examiner

FIG.9

APPARATUS FOR CONTROLLING OPERATION IN WIRELESS TERMINAL WITH REMOVABLE CASE

PRIORITY

This application claims the benefit under 35 U.S.C. §119 (a) of a Korean patent application filed in the Korean Industrial Property Office on Mar. 13, 2007 and assigned Serial No. 2007-24700, the entire disclosure of which is hereby incorporated by reference.

BACKGROUND OF THE INVENTION

1. Field of the Invention

The present invention relates to a portable terminal. More particularly, the present invention relates to an apparatus for controlling the operation of a portable terminal including a plurality of display units.

2. Description of the Related Art

In general, the term "portable terminal" refers to a communication apparatus that a user can carry to wirelessly communicate with another user. Such portable terminals are extensively used among individuals. Also, such terminals are recently being provided with the ability to perform various kinds of useful functions in accordance with the Digital Convergence era. For example, with such a portable terminal, the user may perform Audio On Demand (AOD) and Video On Demand (VOD) services, may have visual communication with another user, or may download games to play. Also of interest is the user's ability to obtain high quality content (e.g. high quality moving pictures or online games) through a High-Speed Downlink Packet Access (HSDPA) service. With these newer functions and capabilities, it is desirable that the size of a display unit of a portable terminal be made larger. However, a portable terminal is limited in size due to its portability. One option for maintaining the terminal's overall size while increasing the size of the display is to develop the portable terminal toward excluding the key input unit therefrom (e.g. an i-phone produced by Apple company) or minimizing the number of keys in the key input unit thereof. However, such a portable terminal causes a wide variety of inconveniences for the user to input characters thereto. In order to address such inconveniences, the user may be provided with a portable terminal including two displays (dual display). The dual display portable terminal is a two-sided portable terminal including first and second surfaces thereof. The first surface has a display unit of a large size which is suitable for the multimedia environment and a minimized key input unit. The second surface has a display unit of a small size, which is suitable for normal communication, and a plurality of keys. Although there is an advantage in that such dual-display portable terminal can be more conveniently used in the multimedia environment, the dual-display portable terminal consumes more power, thereby shortening the usable time of the portable terminal. Therefore, in order to improve the continuous use of the portable terminal, a removable case having a battery mounted therein is required. The removable case has an advantage in increasing the usable time of the portable terminal. On the other hand, the removable case has a disadvantage in that it is difficult to achieve screen-shift between two display units. Particularly, the removable case has a structure to cover an exterior of each display unit so as to protect each display unit of the dual-display portable terminal. Therefore, a significant effort is required to open/close the removable case whenever the user uses the portable terminal. Even if the removable case is absent, the user has to achieve screen-shift between two display units, depending on the user's necessity, by using a screen shift key. Therefore, with respect to portable terminals having a plurality of display units, there is a need for providing a portable terminal which can easily achieve screen shift without a separate key input.

SUMMARY OF THE INVENTION

An aspect of the present invention is to address at least the above-mentioned problems and/or disadvantages and to provide at least the advantages described below. Accordingly, an aspect of the present invention is to provide a portable terminal in which screen-shifts between a plurality of display units thereof can be easily achieved without a separate key input.

In accordance with an aspect of the present invention, an apparatus for controlling the operation of a portable terminal having a removable case is provided. The apparatus includes a plurality of display units disposed in front and rear surfaces of the portable terminal, respectively, a detecting unit for detecting that the front or rear surface of the portable terminal approaches a corresponding cover of the removable case and a controller for activating a display unit disposed in one surface of the front and rear surfaces of the portable terminal, wherein approach of a corresponding cover of the removable case to said one surface is not detected.

In accordance with another aspect of the present invention, an apparatus for controlling the operation of a portable terminal having a removable case is provided. The apparatus includes a plurality of display units disposed in front and rear surfaces of the portable terminal, respectively, a detecting unit for detecting approach of one surface of the front and rear surfaces of the portable terminal to a corresponding cover of the removable case and a controller for performing a control operation such that an operation mode is performed depending on if the front or rear surface of the portable terminal approaches the corresponding cover of the removable case.

In accordance with yet another aspect of the present invention, an apparatus for controlling the operation of a portable terminal having a removable case is provided. The apparatus includes a plurality of display units positioned in front and rear surfaces of the portable terminal, respectively, a detecting unit for detecting approach of the front or the rear surface of the portable terminal to a corresponding cover of the removable case and a controller for activating a display unit when approach of a corresponding cover of the removable case to one surface of the front and rear surfaces of the portable terminal is detected, the display unit being disposed in another surface of the portable terminal, wherein approach of a corresponding cover of the removable case to said another surface is not detected.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
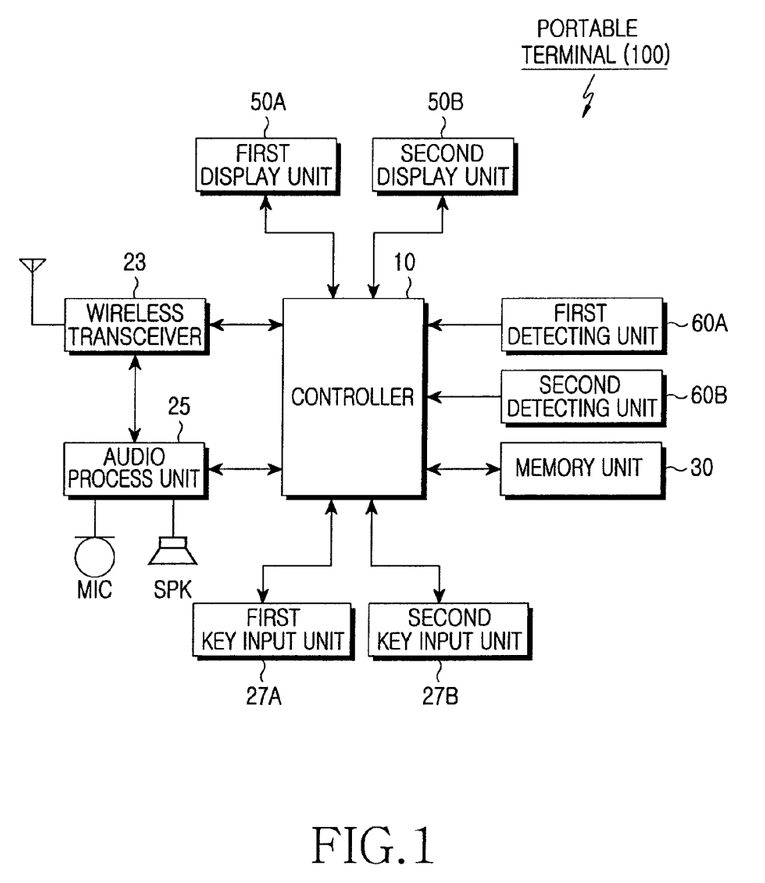
FIG. 1 is a block diagram of a portable terminal according to an exemplary embodiment of the present invention.

FIG. 1 is a block diagram of a portable terminal 100 according to an exemplary embodiment of the present invention.

Referring to FIG. 1, a wireless transceiver 23 includes an RF unit and a modem. The RF unit includes an RF transmitter for amplification of transmitted signals and upward conversion of their frequency, an RF receiver for low-noise amplification of received signals and down conversion of their frequency, etc. The modem has a transmitter for encoding and modulating signals to be transmitted and a receiver for decoding and demodulating signals received in the RF unit.

An audio processing unit 25 may include a codec. The codec includes a data codec and an audio codec. The data codec processes packet data, etc., and the audio codec processes audio signals such as voice and multimedia files, etc. Furthermore, the audio processing unit 25 converts digital audio signals, which are received from the modem, to analog audio signals through the audio codec and regenerates them. In addition, the audio processing unit 25 converts analog audio signals, which are generated by a microphone, to digital audio signals through the audio codec and transmits them to the modem. The codec may be a separate component or may be included in a controller 10.

A first key input unit 27A and a second key input unit 27B each have keys for inputting number/character information and function keys for setting up various kinds of functions. The first and second key input units 27A and 27B may each include a touch sensor so as to receive a key input by a user's touch. The first and second key input units 27A and 27B may also be inactivated by a hold key (not shown) so that an undesired key input can be prevented (Key Lock), or be activated so that a normal key input can be allowed. Furthermore, at least one of the first and second key input units 27A and 27B may include a screen shift key by which screen-shifts between display units can be achieved.

A memory unit 30 may include program memories and data memories. The program memories store programs for controlling typical operation of the portable terminal. The memory unit 30, according to an exemplary embodiment of the present invention, may store settings for functions which will be automatically executed depending on if the portable terminal approaches or comes in proximity to a cover of a removable case. The memory unit 30 may comprise a non-volatile memory such as a flash or EEPROM memory.

A first display unit 50A and a second display unit 50 B are provided and may include a Liquid Crystal Display (LCD), an Organic Light Emitting Diode (OLCD), etc., and output a wide variety of display information generated in the portable terminal. The first and second display units 50A and 50B may include a touch screen and, similar to the first and second key input units 27A and 27B, may act as an input unit for controlling the portable terminal. According to an exemplary embodiment, the first key input unit 27A and the first display unit 50A correspond to a front surface of the portable terminal. Similarly, the second key input unit 27B and the second display unit 50B correspond to a rear surface of the portable terminal.

A first detecting unit 60A and a second detecting unit 60B detect if the portable terminal approaches or is in proximity to a cover of the removable case assembled with portable terminal. In an exemplary implementation, the first and second detecting units 60A and 60B include hall sensors. In such an exemplary embodiment, the first and second detecting units 60A and 60B detect if the portable terminal approaches either cover of the removable case using magnets 210A and 210B (FIG. 2) included in the case covers of the removable case, respectively.

The controller 10 controls the overall operation or driving mode of the portable terminal. In an exemplary embodiment, the controller 10 determines if the portable terminal is in proximity to a cover of the removable case through the first and second detecting units 60A and 60B when the removable case is assembled with the portable terminal. In such an implementation, the controller 10 may execute various functions after determining that the portable terminal is proximate to a cover of the removable case. In one implementation, the fact that the removable case is assembled with the portable terminal can be confirmed through a Current Feedback (CF) terminal included in a connecting terminal connecting the portable terminal to the removable case.

Figure 2:
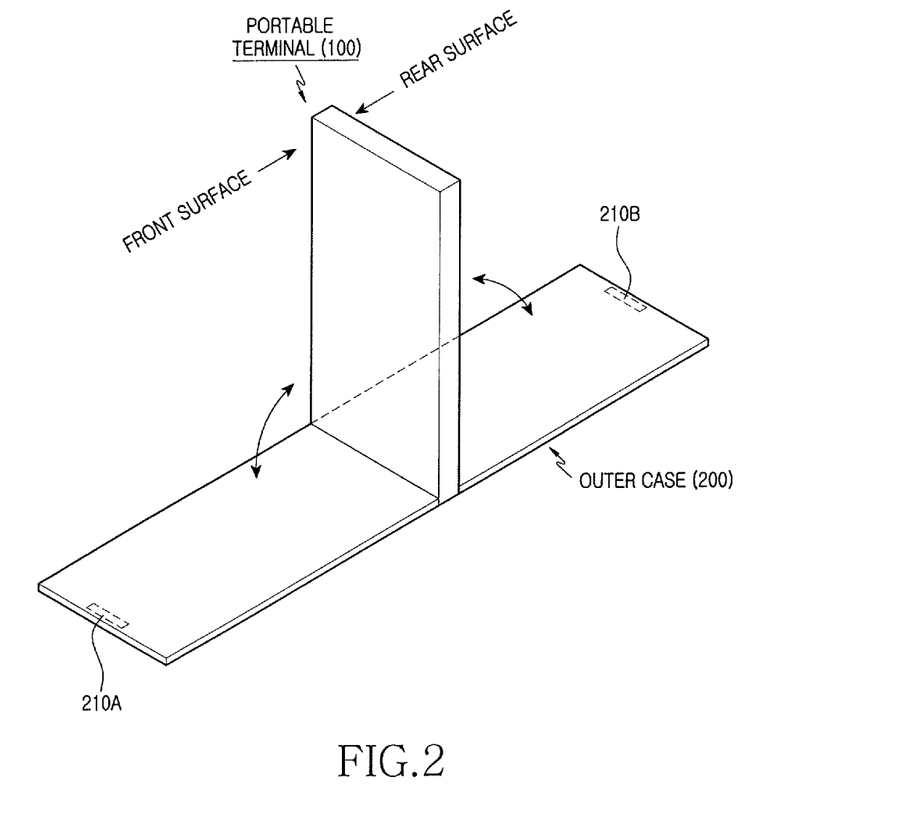
FIG. 2 is a perspective view illustrating a portable terminal and a removable case thereof according to an exemplary embodiment of the present invention.
Figure 3:
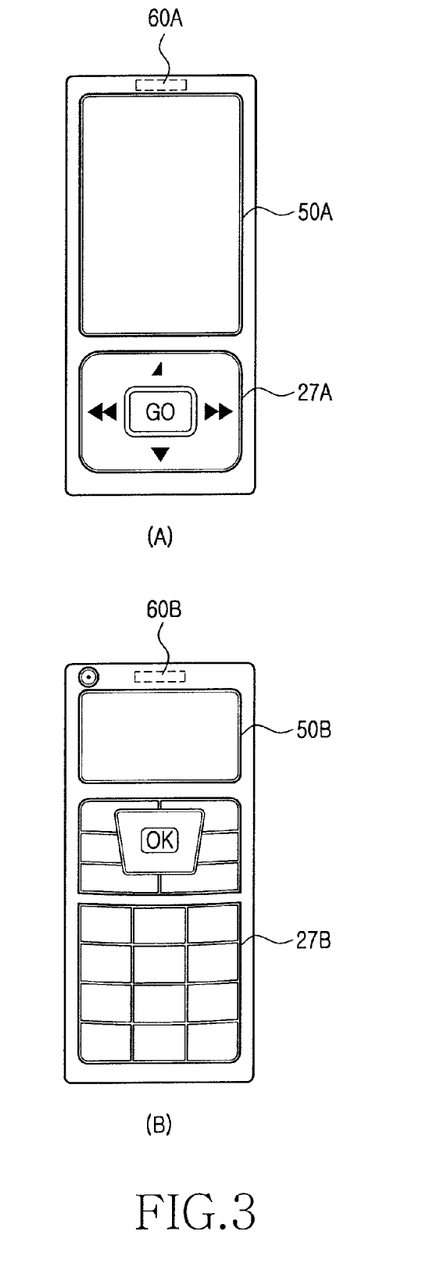
FIGS. 3A and 3B are a front view and a rear view illustrating a portable terminal according to an exemplary embodiment of the present invention.

FIG. 2 is a perspective view illustrating a portable terminal 100 and a removable outer case 200 thereof according to an exemplary embodiment of the present invention, and FIGS. 3A and 3B are a front view and a rear view illustrating a portable terminal according to an exemplary embodiment of the present invention.

Referring to FIG. 2, the removable outer case 200 may include a flip-type removable case including covers folded on/unfolded from each other, which correspond to the front surface of the portable terminal (e.g. a surface corresponding to the first display unit and the first key input unit) and the rear surface thereof (e.g. a surface corresponding to the second display unit and the second key input unit), respectively. In an exemplary implementation, the removable case 200 includes the magnets 210A and 210B in each cover thereof. As used herein, the magnets 210A and 210B are a detecting means for enabling the detecting units (the first and second detecting units) to detect if one surface (the frond or rear surface) of the portable terminal is in proximity to a corresponding cover of the removable case 200. It should be understood that the illustrated detecting means, such as a magnet, are merely exemplary and can be replaced with another detecting means.

FIG. 3A is a front view illustrating a front surface of a portable terminal according to an exemplary embodiment of the present invention. The front surface of the portable terminal includes the first display unit 50A, the first key input unit 27A and the first detecting unit 60A. The front surface of the portable terminal is a surface corresponding to a cover of the removable case (the cover in which the magnet 210A shown in FIG. 2 is disposed). The first display unit 50A provides a large-size screen suitable for a multimedia environment. The first key input unit 27A has a key input (e.g. a touch pad input) optimized for the multimedia environment in which various multimedia files output via the first display unit 50A are utilized. The first detecting unit 60A detects if the front surface of the portable terminal is proximate to a cover of the removable case (the cover of the removable case, in which the magnet 210A shown in FIG. 2 is disposed) corresponding to the front surface of the portable terminal or not (e.g. the cover is closed or opened with respect to the front surface of the portable terminal) using the magnet 210A shown in FIG. 2.

FIG. 3B is a rear view illustrating a rear surface of a portable terminal according to an exemplary embodiment of the present invention. The rear surface of the portable terminal includes the second display unit 50B, the second key input unit 27B and the second detecting unit 60B. The second key input unit 27B includes a plurality of keys which enable a user to conveniently input data. The second display unit 50B includes a screen which is smaller than the screen of the first display unit 50A and corresponds to a typical display unit of a conventional portable terminal. The second detecting unit 60B detects if the rear surface of the portable terminal is proximate to a cover of the removable case corresponding to the rear surface of the portable terminal (the cover of the removable case, in which the magnet 210B shown in FIG. 2 is disposed) or not (e.g. the cover is closed or opened) using the magnet 210B shown in FIG. 2.

Figure 4:
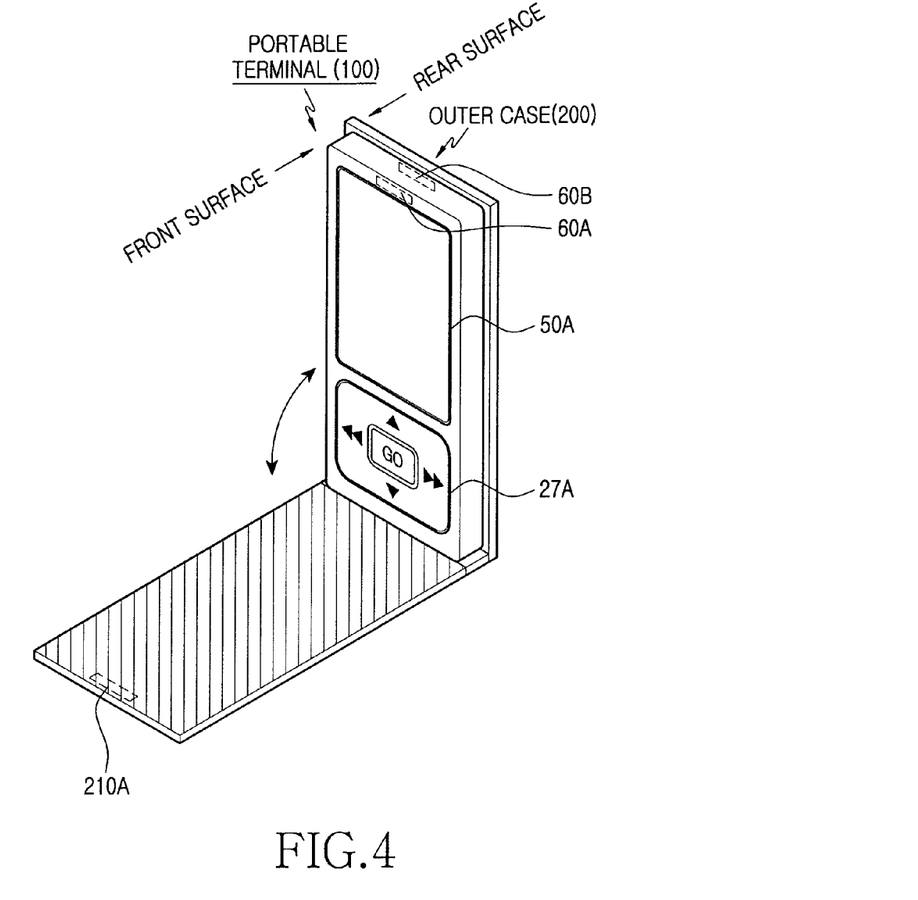
FIG. 4 is a perspective view illustrating a front surface of a portable terminal and each cover of a removable case of the portable terminal according to an exemplary embodiment of the present invention.
Figure 5:
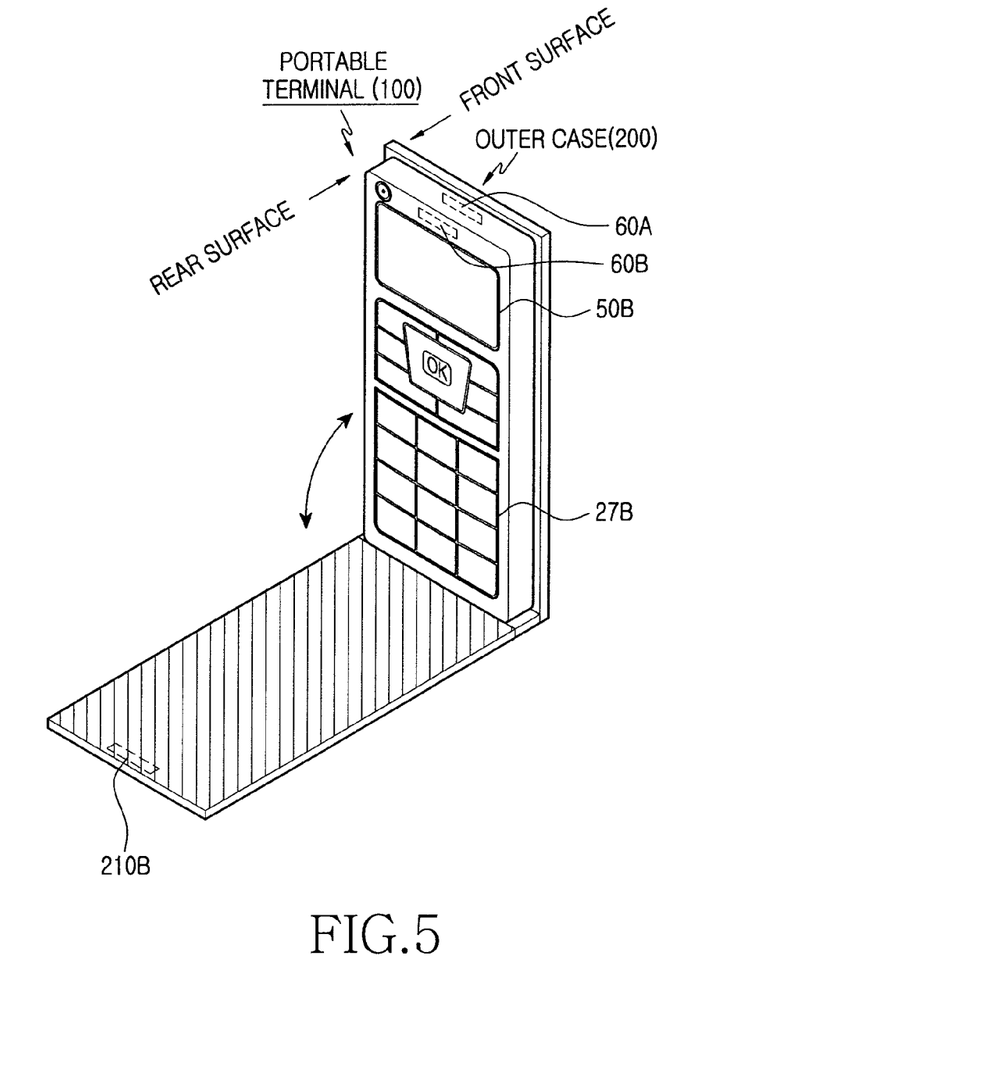
FIG. 5 is a perspective view illustrating a rear surface of a portable terminal and each cover of a removable case of the portable terminal according to an exemplary embodiment of the present invention.

FIG. 4 is a perspective view illustrating a front surface of a portable terminal and each cover of the removable case thereof according to an exemplary embodiment of the present invention. FIG. 5 is a perspective view illustrating a rear surface of a portable terminal and each cover of a removable case thereof according to an exemplary embodiment of the present invention. FIG. 4 is a perspective view illustrating a state in which the front surface of the portable terminal 100 is not proximate to a cover of the removable outer case 200, which corresponds to the front surface of the portable terminal 100. On the other hand, it can be understood that FIG. 4 is a perspective view illustrating a state in which the rear surface of the portable terminal 100 is proximate to the cover of the removable case 200, which corresponds to the rear surface of the portable terminal 100.

FIG. 5 is a perspective view illustrating a state in which a rear surface of the portable terminal 100 is not proximate a cover of the removable case 200, which corresponds to the rear surface of the portable terminal 100. Similar to the case shown in FIG. 4, FIG. 5 is a perspective view illustrating a state in which the front surface of the portable terminal 100 is proximate the cover of the removable case 200, which corresponds to the front surface of the portable terminal 100.

Figure 6:
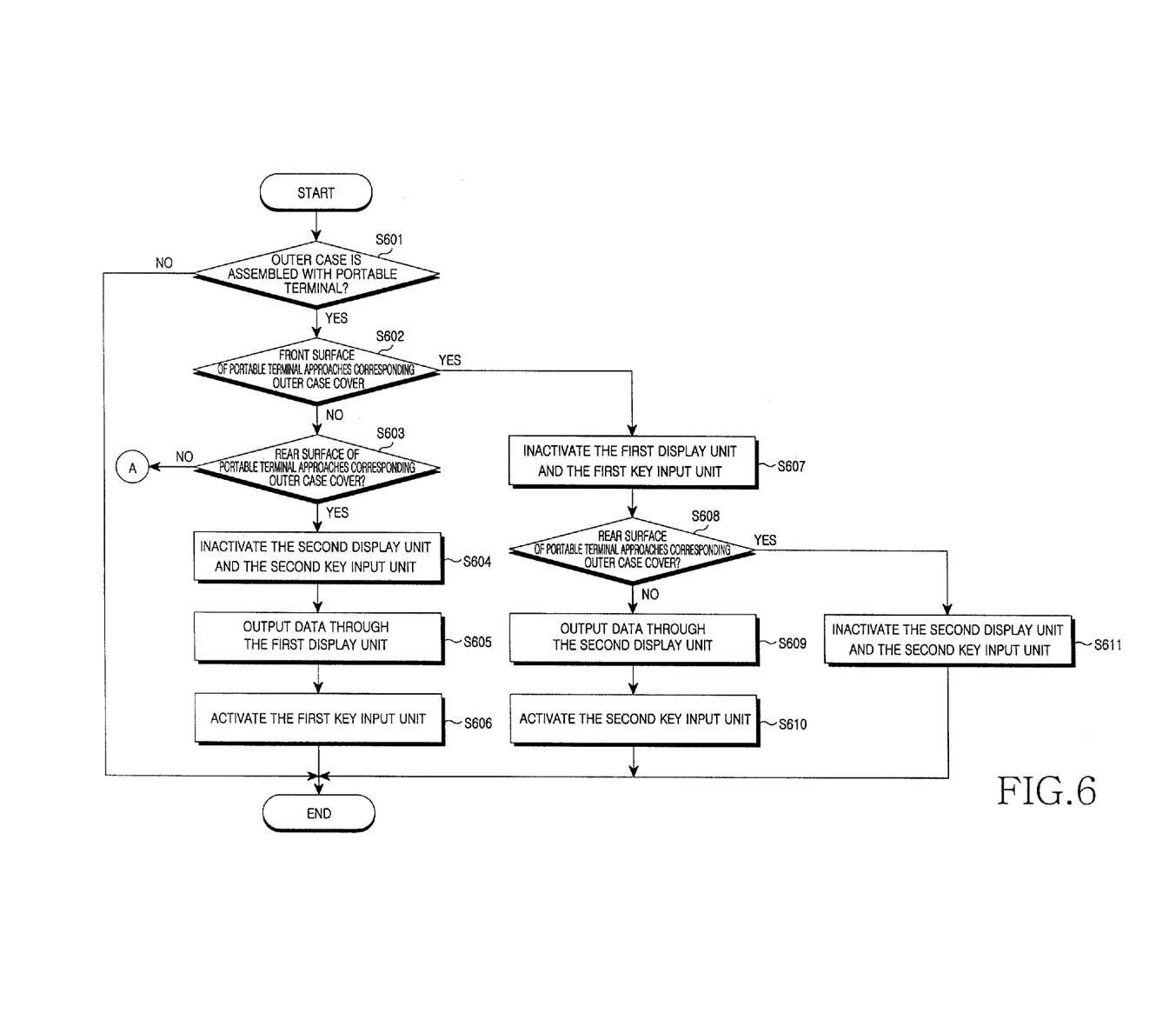
FIGS. 6 to 7 are flow charts illustrating a process of controlling the operation of display units and key input units depending on if a portable terminal approaches each cover of a removable case according to an exemplary embodiment of the present invention.
Figure 7:
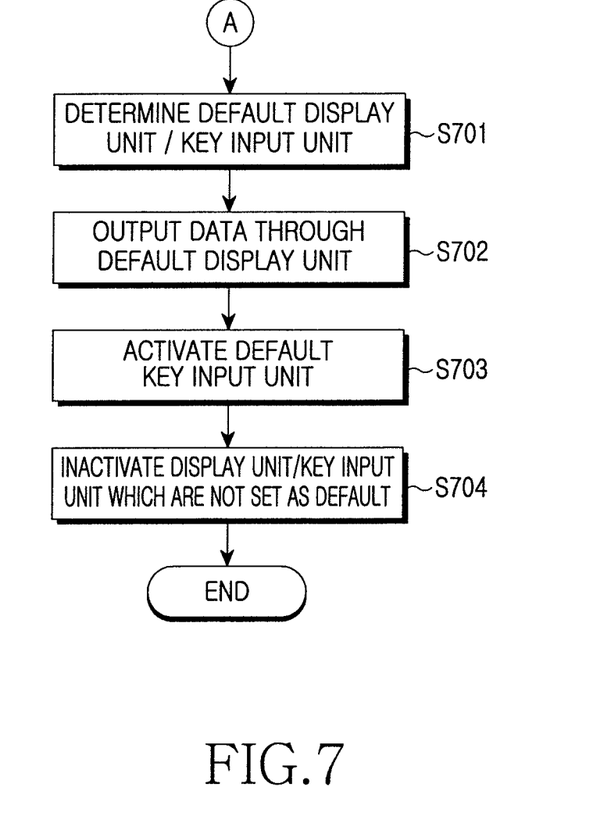

FIGS. 6 and 7 are flow charts illustrating a process of controlling the operation of a display unit and a key input unit depending if the portable terminal is proximate a cover of the removable case, according to an exemplary embodiment of the present invention. The flow charts of FIGS. 6 and 7 will be described below with reference to FIGS. 2 to 5.

When it is determined in step S601 that the removable case is assembled with the portable terminal, the controller 10 determines if the front surface of the portable terminal has approached a corresponding cover of the removable case in step S602. If the front surface of the portable terminal has not approached a corresponding cover of the removable case, the controller 10 determines if the rear surface of the portable terminal has approached a corresponding cover of the removable case in step S603.

When the removable case 200 is assembled with the portable terminal, the controller 10 determines if one of the front and rear surfaces (or both the front and rear surfaces) of the portable terminal has approached a corresponding cover of the removable case through the first and second detecting units 60A and 60B and the detecting means 210A and 210B. As described above, FIG. 4 is a perspective view illustrating a state in which the front surface of the portable terminal 100 does not approach, that is, is not proximate to a corresponding cover of the removable case (e.g. the corresponding cover of the removable case is opened with respect to the front surface thereof). FIG. 5 is a perspective view illustrating a state in which the rear surface of the portable terminal 100 does not approach a corresponding cover of the removable case (e.g. the corresponding cover of the removable case is opened with respect to the rear surface thereof). At this time, when the controller 10 determines that both the front and rear surfaces of the portable terminal have not approached a corresponding cover of the removable case (e.g. both the covers of the removable case are opened with respect to both surfaces of the portable terminal), the controller 10 proceeds to step A of FIG. 7.

When it is determined through steps S602 to S603 that only the rear surface of the portable terminal has approached the removable case of the portable terminal as shown in FIG. 4, the controller 10 inactivates the second display unit 50B and the second key input unit 27B in step S604.

As shown in FIG. 4, when it is determined that only the rear surface of the portable terminal has approached a corresponding cover of the removable case 200 (e.g. only the cover of the removable case corresponding to the front surface of the portable terminal is opened), the controller 10 inactivates the second display unit 50B and the second key input unit 27B which correspond to the rear surface of the portable terminal. In general, a bar-type portable terminal having a key input unit exposed to the exterior, which is different from a folder-type or clamshell-type portable terminal, includes a hold key for preventing erroneous operation of a key input. Therefore, the bar-type portable terminal sets the hold key and activates or inactivates the key input unit so that occurrence of an erroneous key input is prevented. In an exemplary embodiment of the present invention, the key input units can be set to be activated or inactivated without a separate hold key. Particularly, when the cover of the removable case corresponding to the first key input unit 27A is opened (when approach of the front surface of the portable terminal to the corresponding cover of the removable case is not detected), the first key input unit 27A can be set to be activated. On the other hand, when the cover of the removable case corresponding to the first key input unit 27A is closed (when the front surface of the portable terminal approaches the corresponding cover of the removable case), the first key input unit 27A can be set to be inactivated. As a result, when the user uses the first display unit 50A and the first key input unit 27A which correspond to the front surface of the portable terminal 100, it is possible to prevent an erroneous key input caused by the second key input unit 27B.

Then, under the control of the controller 10, data is output through the first display unit of the portable terminal in step S605, and the first key input unit is activated in step S606.

Under the control of the control unit 10, the first display unit 50A is activated, and data of the portable terminal (e.g. a wide variety of display information) is output through the activated first display unit 50A. Furthermore, under the control of the control unit 10, the first key input unit 27A is activated, a key input is received from the user through the activated first key input unit 27A, and a corresponding function is executed.

When it is confirmed in step S602 that the front surface of the portable terminal has approached a corresponding cover of the removable case, the controller 10 inactivates the first display unit and the first key input unit in step S607, and determines if the rear surface of the portable terminal has approached a corresponding cover of the removable case in step S608.

As shown in FIG. 5, when it is determined that the front surface of the portable terminal 100 has approached a corresponding cover of the removable case 200, the controller 10 inactivates the first display unit 50A and the first key input unit 27A which are disposed in the front surface of the portable terminal, thereby preventing power consumption and an undesired key input. The controller 10 also determines if the rear surface of the portable terminal 100 has approached a corresponding cover of the removable case 200.

When it is determined in step S608 that the rear surface of the portable terminal has not approached a corresponding cover of the removable case, under the control of the controller 10, data is output through the second display unit in step S609, and the second key input unit is activated in step S610.

When it is determined through steps S602 and S608 that only the rear surface of the portable terminal 100 has not approached a corresponding cover of the removable case 200, the controller 10 performs a control operation such that the user's input is received through the second display unit 50B and the second key input unit 27B which are disposed in the rear surface of the portable terminal 100.

When it is confirmed through steps S602 and S608 that both the front and rear surfaces of the portable terminal have approached corresponding covers of the removable case, the controller 10 inactivates the second display unit and the second key input unit in step S611. Through step S611, the controller 10 inactivates all display units and all key input units while the portable terminal is not be used, thereby preventing an erroneous operation of the portable terminal and unnecessary consumption of power.

With reference to FIG. 7, an exemplary operation of the display unit and the key input unit when it is determined that both the front and rear surfaces of the portable terminal have not approached corresponding covers of the removable case will be described hereinafter.

As shown in FIG. 2, when both covers of the removable case are opened with respect to both surfaces of the portable terminal, the controller 10 determines a display unit and a key input unit set as default in step S701, outputs data through the default display unit in step S702, activates the default key input unit in step S703 and inactivates a display unit and a key input unit which are not set as default in step S704.

When the main body of the portable terminal 100 does not approach any cover of the removable case 200 as shown in FIG. 2, the controller 10 determines the default display unit and the default key input unit and causes them to be used. At this time, under the control of the controller 10, separate operation is not performed when both covers of the removable case are opened as shown in FIG. 2.

According to an exemplary embodiment of the present invention, which is described with reference to FIGS. 6 and 7, the user can select a desired display unit or a desired key input unit to use by which the user enables the main body of the portable terminal to come in contact with each cover of the removable case in a predetermined direction.

Figure 8:
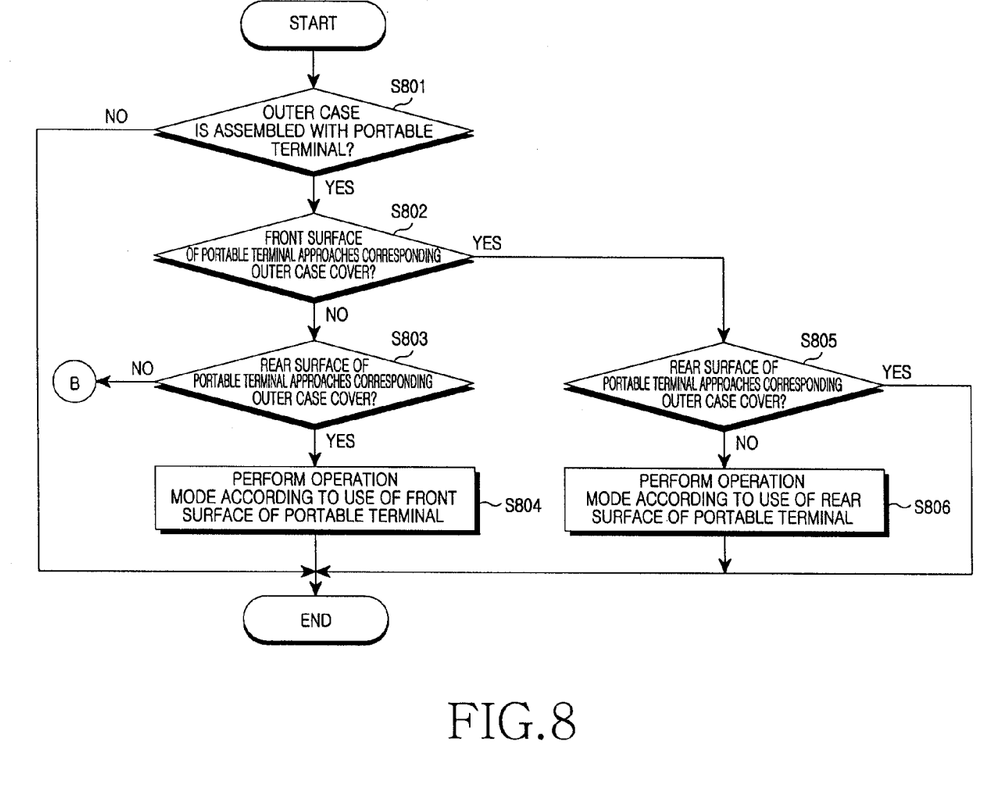
FIGS. 8 to 9 are flow charts illustrating a process of performing an operating mode depending on if a portable terminal approaches each cover of a removable case according to an exemplary embodiment of the present invention.
Figure 9:
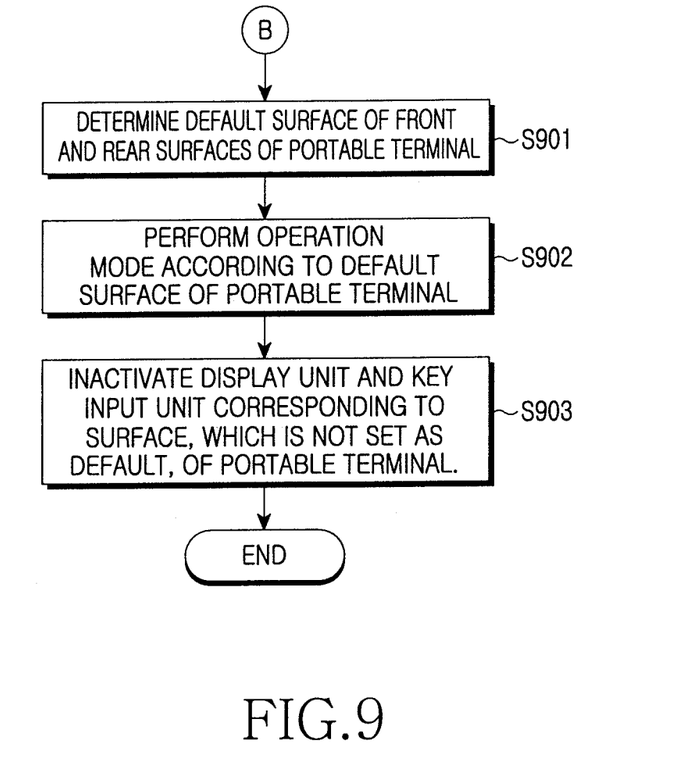

FIGS. 8 to 9 are flow charts illustrating a process of performing an operation depending on if the portable terminal approaches each cover of the removable case according to an exemplary embodiment of the present invention. As illustrated in FIGS. 6 and 7, a shift between each display unit and each input unit can be made depending on the approach of the portable terminal with respect to each cover of the removable case. On the other hand, according to an exemplary embodiment as illustrated in FIGS. 8 and 9, an operation (function) is automatically performed depending on which cover of the removable case the portable terminal approaches.

When it is determined that the removable case is assembled with the portable terminal in step S801, the controller 10 determines if the front surface of the portable terminal has approached a corresponding cover of the removable case in step S802. If the front surface of the portable terminal has not approached a corresponding cover of the removable case, the controller 10 determines if the rear surface of the portable terminal has approached a corresponding cover of the removable case in step S803.

When it is determined through steps S801 to S803 that only the rear surface of the portable terminal has approached a corresponding cover of the removable case as illustrated in FIG. 4, the controller 10 performs a control operation such that an operation mode is performed depending on the use of the front surface of the portable terminal in step S804.

When only the rear surface of the portable terminal 100 approaches a corresponding cover of the removable case as shown in FIG. 4, under the control of the controller 10, an operating mode is automatically performed. The front surface of the portable terminal 100 according to an exemplary embodiment of the present invention includes a large-size display unit (the first display unit) and a touch pad (the first key input unit). Therefore, the controller 10 can perform a control operation such that an operation mode suitable for executing the large-size display unit can be automatically performed. For example, the controller 10 can automatically perform a Digital Multimedia Broadcasting (DMB) menu and a codec regeneration menu (e.g. a MP3 generation menu or a MP4 regeneration menu, etc.). At the same time, the controller 10 can set the first key input unit 27A to be automatically activated (when the first key input unit 27A is previously set to be inactivated). At this time, the user can set the operation mode, which is automatically performed, to end when the cover of the removable case, which corresponds to the first display unit 50A, is closed (when the front surface of the portable terminal approaches a corresponding cover of the removable case). Therefore, the controller 10 according to an exemplary embodiment of the present invention can cause a program, which is automatically performed, to end, or inactivate the first key input unit 27A when it is determined that the front surface of the portable terminal has approached a corresponding cover of the removable case.

When it is determined that the rear surface of the portable terminal has not approached a corresponding cover of the removable case in step S805, the controller 10 performs a control operation such that an operation is performed depending on the determination in step S806. When approach of only the front surface of the portable terminal to a corresponding cover of the removable case as show in FIG. 5 is detected, under the control of the controller 10, a program suitable for the rear surface (or the second display unit 50B) of the portable terminal can be automatically performed, and the second key input unit 27B can be activated. For example, the controller 10 can automatically display the user's list of contacts, and when a call is received, the controller 10 determines that a call key is input and causes the call to be automatically is initiated. At this time, when it is determined that the rear surface of the portable terminal has approached a corresponding cover of the removable case, under the control of the controller 10, a program, which is automatically performed, can be ended, or the second key input unit 27A can be inactivated.

When both the rear and front surfaces of the portable terminal do not approach both covers of the removable case, respectively, as shown in FIG. 2, the controller 10 determines one surface set as default of the portable terminal (one of the rear and front surfaces of the portable terminal) in step S901, performs an operation mode according to the default surface of the portable terminal in step S902, and inactivates the display unit and the key input unit which correspond to another surface which is not set as default in step S903.

For example, the controller 10 performs step S804 when the front surface of the portable terminal is a surface set as default, and can perform step S806 when the rear surface of the portable terminal is a surface set as default.

As described above, according to exemplary embodiments of the present invention, in the portable terminal having multi-surfaces in which display units are disposed, respectively, there is an advantage in that the user can conveniently select a desired surface of the portable terminal to use, and needed functions are conveniently and automatically executed and ended.

While the invention has been shown and described with reference to certain exemplary embodiments thereof, and it is clear that the described embodiments are not limiting, but only exemplary, and it will be understood by those skilled in the art that various changes in form and details may be made therein without departing from the spirit and scope of the invention as defined by the appended claims and their equivalents.

What is claimed is:

1. An apparatus for controlling the operation of a portable terminal having a removable case, the apparatus comprising:
   a plurality of display units, each of the plurality of display units disposed in at least one of a front surface and a rear surface of the portable terminal;
   a detecting unit for detecting if at least one of the front surface and the rear surface of the portable terminal is proximate to a corresponding cover of the removable case; and
   a controller for activating at least one of the plurality of display units disposed in one of the front and rear surfaces of the portable terminal when approach of a corresponding cover of the removable case to said at least one of the front and rear surfaces is not detected.

2. The apparatus as claimed in claim 1, wherein the controller outputs data through the at least one activated display unit.

3. The apparatus as claimed in claim 1, wherein the controller activates a key input unit disposed in said at least one of the front and rear surfaces of the portable terminal when proximity of the corresponding cover of the removable case to said at least one of the front and rear surfaces is not detected.

4. The apparatus as claimed in claim 1, wherein the controller inactivates a key input unit disposed in another one of the front and rear surfaces of the portable terminal when proximity of a corresponding cover of the removable case to said another one of the front and rear surfaces is detected.

5. The apparatus as claimed in claim 1, wherein the removable case comprises a battery.

6. An apparatus for controlling the operation of a portable terminal having a removable case, the apparatus comprising:
   a plurality of display units, each of the plurality of display units disposed in at least one of a front surface and a rear surface of the portable terminal;
   a detecting unit for detecting proximity of at least one of the front surface and the rear surface of the portable terminal to a corresponding cover of the removable case; and
   a controller for controlling an operation mode depending on if the at least one of the front and rear surfaces of the portable terminal approaches the corresponding cover of the removable case.

7. The apparatus as claimed in claim 6, wherein, in the operation mode, a function is executed through at least one of the plurality of display units disposed in another one of the front and rear surfaces of the portable terminal when proximity of a corresponding cover of a removable case to said another one of the front and rear surfaces is not detected.

8. The apparatus as claimed in claim 6, wherein, in the operation mode, when proximity of the corresponding cover of the removable case to said at least one of the front and rear surfaces of the portable terminal is detected, a function being executed through a display unit disposed in said at least one of the front and rear surfaces of the portable terminal is stopped and the portable terminal enters a waiting mode.

9. The apparatus as claimed in claim 6, wherein, in the operation mode, data is output through a display unit disposed in another one of the front and rear surfaces of the portable terminal when proximity of a corresponding cover of the removable case to said another one of the front and rear surfaces of the portable terminal is not detected.

10. The apparatus as claimed in claim 6, wherein, in the operation mode, a key input unit disposed in another one of the front and rear surfaces of the portable terminal is activated when proximity of a corresponding cover of the removable case to the another one of the front and rear surfaces is not detected.

11. The apparatus as claimed in claim 6, wherein, in the operation mode, a key input unit disposed in said one of the front and rear surfaces of the portable terminal is inactivated when proximity of a corresponding cover of the removable case to said one of the front and rear surfaces is detected.

12. The apparatus as claimed in claim 6, wherein the removable case comprises a battery.

13. An apparatus for controlling the operation of a portable terminal having a removable case, the apparatus comprising:
   a plurality of display units, each of the plurality of display units positioned in at least one of a front surface and a rear surface of the portable terminal;
   a detecting unit for detecting proximity of at least one of the front surface and the rear surface of the portable terminal to a corresponding cover of the removable case; and
   a controller for activating a display unit when proximity of the corresponding cover of the removable case to the at least one of the front and rear surfaces of the portable terminal is detected, the display unit being disposed in another one of the front and rear surfaces of the portable terminal, when proximity of a corresponding cover of the removable case to said another one of the front and rear surfaces is not detected.

14. The apparatus as claimed in claim 13, wherein the controller outputs data through the activated display unit.

15. The apparatus as claimed in claim 13, wherein the controller inactivates a display unit disposed in said at least one of the front and rear surfaces of the portable terminal when proximity of a corresponding cover of the removable case to said at least one of the front and rear surfaces of the portable terminal is detected.

16. The apparatus as claimed in claim 13, wherein the controller inactivates a key input unit disposed in said at least one of the front and rear surfaces of the portable terminal when proximity of a corresponding cover of the removable case to said at least one of the front and rear surfaces of the portable terminal is detected.

17. The apparatus as claimed in claim 13, wherein the controller activates a key input unit disposed in said another one of the front and rear surfaces of the portable terminal when proximity of a corresponding cover of the removable case to said another one of the front and rear surfaces of the portable terminal is not detected.

18. The apparatus as claimed in claim 13, wherein, under control of the controller, the portable terminal enters a waiting mode when proximity of corresponding covers of the removable case to both the front and rear surfaces of the portable terminal is detected.

19. The apparatus as claimed in claim 13, wherein the removable case comprises a battery.

\* \* \* \* \*